(12) United States Patent
Ueki et al.

(10) Patent No.: US 9,199,590 B2
(45) Date of Patent: Dec. 1, 2015

(54) VEHICLE CONTROL DEVICE, VEHICLE, AND VEHICLE CONTROL METHOD

(75) Inventors: Nobukazu Ueki, Susono (JP); Koji Ito, Nagoya (JP); Michihiro Miyashita, Susono (JP); Kouhei Tochigi, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/358,802

(22) PCT Filed: Nov. 18, 2011

(86) PCT No.: PCT/JP2011/006449
§ 371 (c)(1),
(2), (4) Date: May 16, 2014

(87) PCT Pub. No.: WO2013/072974
PCT Pub. Date: May 23, 2013

(65) Prior Publication Data
US 2014/0257636 A1 Sep. 11, 2014

(51) Int. Cl.
*B60R 16/02* (2006.01)
*B60R 16/033* (2006.01)
*H02J 7/00* (2006.01)
*F02D 29/02* (2006.01)
*B60W 30/18* (2012.01)
*B60W 10/06* (2006.01)
*B60W 10/30* (2006.01)

(52) U.S. Cl.
CPC ............ *B60R 16/033* (2013.01); *B60W 10/06* (2013.01); *B60W 10/30* (2013.01); *B60W 30/18018* (2013.01); *F02D 29/02* (2013.01); *B60W 2510/244* (2013.01); *B60W 2710/244* (2013.01)

(58) Field of Classification Search
CPC .......... B60R 16/033; B60W 2510/244; B60W 30/18018; F02D 29/02
See application file for complete search history.

(56) References Cited

U.S. PATENT DOCUMENTS

| 6,936,934 | B2 * | 8/2005 | Morimoto et al. | 307/9.1 |
| 7,657,351 | B2 * | 2/2010 | Moran | 701/22 |
| 2001/0053950 | A1 * | 12/2001 | Hasegawa et al. | 701/22 |
| 2002/0142884 | A1 * | 10/2002 | Kitajima et al. | 477/2 |
| 2004/0012206 | A1 * | 1/2004 | Wakashiro et al. | 290/40 C |

(Continued)

FOREIGN PATENT DOCUMENTS

| JP | 2004-201411 A | 7/2004 |
| JP | 2005-067293 A | 3/2005 |

(Continued)

*Primary Examiner* — Jerrah Edwards
*Assistant Examiner* — Demetra Smith-Stewart
(74) *Attorney, Agent, or Firm* — Kenyon & Kenyon LLP

(57) ABSTRACT

A vehicle control device is mounted on a vehicle and the vehicle includes an engine and a battery. The battery can be charged by an amount of electric power generated by an alternator that is driven by power from the engine. The vehicle control device includes an electrical control unit. The electrical control unit is configured to; (i) perform idling stop, (ii) detect a state of charge of the battery, (iii) set a capacity for idling stop that is predicted to be used in a stop and start period between stop and restart of the engine, during stop control, within an usable SOC range of the battery while the vehicle is running, and (iv) control the amount of electric power to prevent a remaining capacity in the usable SOC range corresponded to the state of charge from falling below the capacity for idling stop while the vehicle is running.

6 Claims, 6 Drawing Sheets

(56) References Cited

U.S. PATENT DOCUMENTS

| | | | |
|---|---|---|---|
| 2010/0174460 A1* | 7/2010 | Gibson et al. | 701/54 |
| 2010/0300414 A1* | 12/2010 | Pursifull et al. | 123/559.1 |
| 2010/0332062 A1* | 12/2010 | Goto et al. | 701/22 |
| 2011/0135498 A1* | 6/2011 | Gibson et al. | 417/15 |
| 2011/0251746 A1* | 10/2011 | Wu et al. | 701/22 |
| 2012/0109439 A1* | 5/2012 | Akebono et al. | 701/22 |
| 2012/0153890 A1 | 6/2012 | Takahashi et al. | |
| 2012/0232731 A1* | 9/2012 | Sujan et al. | 701/22 |
| 2013/0005532 A1* | 1/2013 | Gibson et al. | 477/115 |

FOREIGN PATENT DOCUMENTS

| | | |
|---|---|---|
| JP | 2005-291158 A | 10/2005 |
| JP | 2011-026993 A | 2/2011 |
| JP | 2011-027472 A | 2/2011 |
| JP | 2011-149345 A | 8/2011 |
| JP | 2011-163281 A | 8/2011 |

* cited by examiner

VEHICLE CONTROL DEVICE, VEHICLE, AND VEHICLE CONTROL METHOD

CROSS-REFERENCE TO RELATED APPLICATIONS

This is a national phase application based on the PCT International Patent Application No. PCT/JP2011/006449 filed Nov. 18, 2011, the entire contents of which are incorporated herein by reference.

TECHNICAL FIELD

The present invention relates to a vehicle control device that is mounted on a vehicle that has an engine and a battery, a vehicle, and a vehicle control method.

BACKGROUND ART

An engine and a battery are mounted on an automobile, and the battery is charged using power from the engine. Conventionally, as charge control that is performed to charge a battery, a technology to reduce the charge to the battery to reduce fuel consumption during normal running and to charge the battery by regenerative electric power generation during deceleration is known.

As control that reduces fuel consumption, idling stop (also referred to as idle reduction) control is known. In Patent Literature 1 below, an automobile is disclosed that is provided with both a charge control function and an idling stop control function to meet a demand for improving fuel efficiency.

In the above technology, however, when the amount of electric power that is stored in the battery is consumed by auxiliary machines while the engine is kept stopped by idling stop control, the engine may be restarted because of a shortage of SOC (State of Charge). The "SOC" is an index that represents how much electric power remains in a battery. Especially, in the above technology, engine restart due to a shortage of SOC is likely to occur because the surplus SOC is decreased by the charge control function. Thus, the fuel efficiency cannot be sufficiently improved and there is a room for improvement.

PRIOR ART DOCUMENT

Patent Literature

Patent Literature 1: Japanese Patent Application Publication No. 2005-67293 (JP 2005-67293 A)
Patent Literature 2: Japanese Patent Application Publication No. 2011-163281 (JP 2011-163281 A)

SUMMARY OF THE INVENTION

Problem to be Solved by the Invention

The present invention has been made to solve at least a part of the above conventional problem, and an object of the present invention is to further improve the fuel efficiency of vehicles.

Means for Solving the Problem

To solve at least a part of the above problem, the present invention can be implemented in the form of the following aspects or application examples.

Application Example 1

A vehicle control device that is mounted on a vehicle that has an engine, and a battery that can be charged by the amount of electric power that is generated by an electric power generator that is driven by power from the engine, the vehicle control device including:
an idling stop control part that performs idling stop control;
an SOC detection part that detects the state of charge (SOC) of the battery;
an idling stop capacity setting part that sets a capacity for idling stop that is predicted to be used in a stop and start period between stop and restart of the engine by the idling stop control within the usable SOC range of the battery while the vehicle is running; and
a remaining capacity control part that controls the amount of electric power that is generated by the electric power generator to prevent the remaining capacity in the usable SOC range that corresponds to the SOC that is detected by the SOC detection part from falling below the capacity for idling stop while the vehicle is running.

According to this configuration, the amount of electric power that is generated by the electric power generator while the vehicle is running is controlled so that the remaining capacity in the usable SOC range of the battery can be controlled not to fall below the capacity for idling stop that is predicted to be used in a stop and start period. Thus, the restart of the engine due to a shortage of SOC in the middle of a stop and start period can be prevented. Because increasing SOC by increasing engine power while the engine is operating has a higher fuel efficiency effect per unit SOC (1% of SOC, for example) compared to the case where the engine is restarted because of a shortage of SOC in the middle of a stop and start period, the fuel efficiency of the vehicle can be improved.

Application Example 2

The vehicle control device according to Application Example 1,
further including a charge control part that reduces the electric power generation by the electric power generator while the vehicle is running and permits the charge to the battery by regenerative electric power generation during deceleration of the vehicle,
in which the idling stop capacity setting part sets a parameter that defines a distribution ratio at which the usable SOC range of the battery is distributed between a capacity for charge control that will be required as a result of the reduction of the electric power generation by the electric power generator by the charge control part and the capacity for idling stop as the capacity for idling stop.

According to this configuration, the usable SOC range of the battery is distributed between a capacity for charge control and a capacity for idling stop. A parameter that defines the distribution ratio between the capacity for charge control and the capacity for idling stop is set as the capacity for idling stop. Thus, a capacity for idling stop can be set appropriately within the usable SOC range of the battery.

Application Example 3

The vehicle control device according to Application Example 1 or 2,
in which the idling stop capacity setting part includes a running environment prediction part that predicts the running environment of the vehicle in which the vehicle is brought to a stop, and a capacity determination part that determines the capacity for idling stop based on the running environment.

According to this configuration, the capacity for idling stop that is predicted to be used in a stop and start period can be estimated with a high degree of accuracy based on the running environment. This increases the certainty of improvement of fuel efficiency.

Application Example 4

The vehicle control device according to Application Example 3, in which the vehicle further includes auxiliary machines that operate using the SOC of the battery, and in which the idling stop capacity setting part further includes a subject vehicle state calculation part that calculates a subject vehicle state that relates to the operating conditions of the auxiliary machines, and the capacity determination part determines the capacity for idling stop based on the subject vehicle state in addition to the running environment.

When the amount of electric power that is consumed by the auxiliary machines is large, the SOC is consumed at a high rate. According to this configuration, because the subject vehicle state, which relates to the operating conditions of the auxiliary machines, is also taken into account when the capacity for idling stop is calculated, the capacity for idling stop can be estimated with a higher degree of accuracy. This further increases the certainty of improvement of fuel efficiency.

Application Example 5

The vehicle control device according to Application Example 1 or 2, in which the vehicle further includes auxiliary machines that operate using the SOC of the battery, and in which the idling stop capacity setting part further includes a subject vehicle state calculation part that calculates a subject vehicle state that relates to the operating conditions of the auxiliary machines, and a capacity determination part that determines the capacity for idling stop based on the subject vehicle state.

According to this configuration, the capacity for idling stop that is predicted to be used in a stop and start period can be estimated with a high degree of accuracy based on the subject vehicle state. This increases the certainty of improvement of fuel efficiency.

Application Example 6

A vehicle, including:
an engine;
a battery that can be charged by the amount of electric power that is generated by an electric power generator that is driven by power from the engine;
an idling stop control part that performs idling stop control;
an SOC detection part that detects the state of charge (SOC) of the battery;
an idling stop capacity setting part that sets a capacity for idling stop that is predicted to be used in a stop and start period between stop and restart of the engine by the idling stop control within the usable SOC range of the battery while the vehicle is running; and
a remaining capacity control part that controls the amount of electric power that is generated by the electric power generator to prevent the remaining capacity in the usable SOC range that corresponds to the SOC that is detected by the SOC detection part from falling below the capacity for idling stop while the vehicle is running.

Application Example 7

A vehicle control method for controlling vehicle that has an engine, and a battery that can be charged by the amount of electric power that is generated by an electric power generator that is driven by power from the engine, the vehicle control method including:

(a) a step of performing idling stop control;
(b) a step of detecting the state of charge (SOC) of the battery;
(c) a step of setting a capacity for idling stop that is predicted to be used in a stop and start period between stop and restart of the engine by the idling stop control within the usable SOC range of the battery while the vehicle is running; and
(d) a step of controlling the amount of electric power that is generated by the electric power generator to prevent the remaining capacity in the usable SOC range that corresponds to the SOC that is detected by the SOC detection part from falling below the capacity for idling stop while the vehicle is running.

According to the vehicle of Application Example 6 and the vehicle control method of Application Example 7, as in the case of the vehicle control device of Application Example 1, the restart of the engine due to a shortage of SOC in the middle of a stop and start period can be prevented. Thus, the fuel efficiency of the vehicle can be improved.

It should be noted that the present invention can be implemented in various aspects. For example, the present invention can be implemented in the form of a control system that includes the vehicle control device of Application Example 1, a computer program that causes a computer to execute functions that correspond to the respective steps of the vehicle control method of Application Example 7, or a recording medium in which the computer program is stored.

MODES FOR CARRYING OUT THE INVENTION

Figure 1:
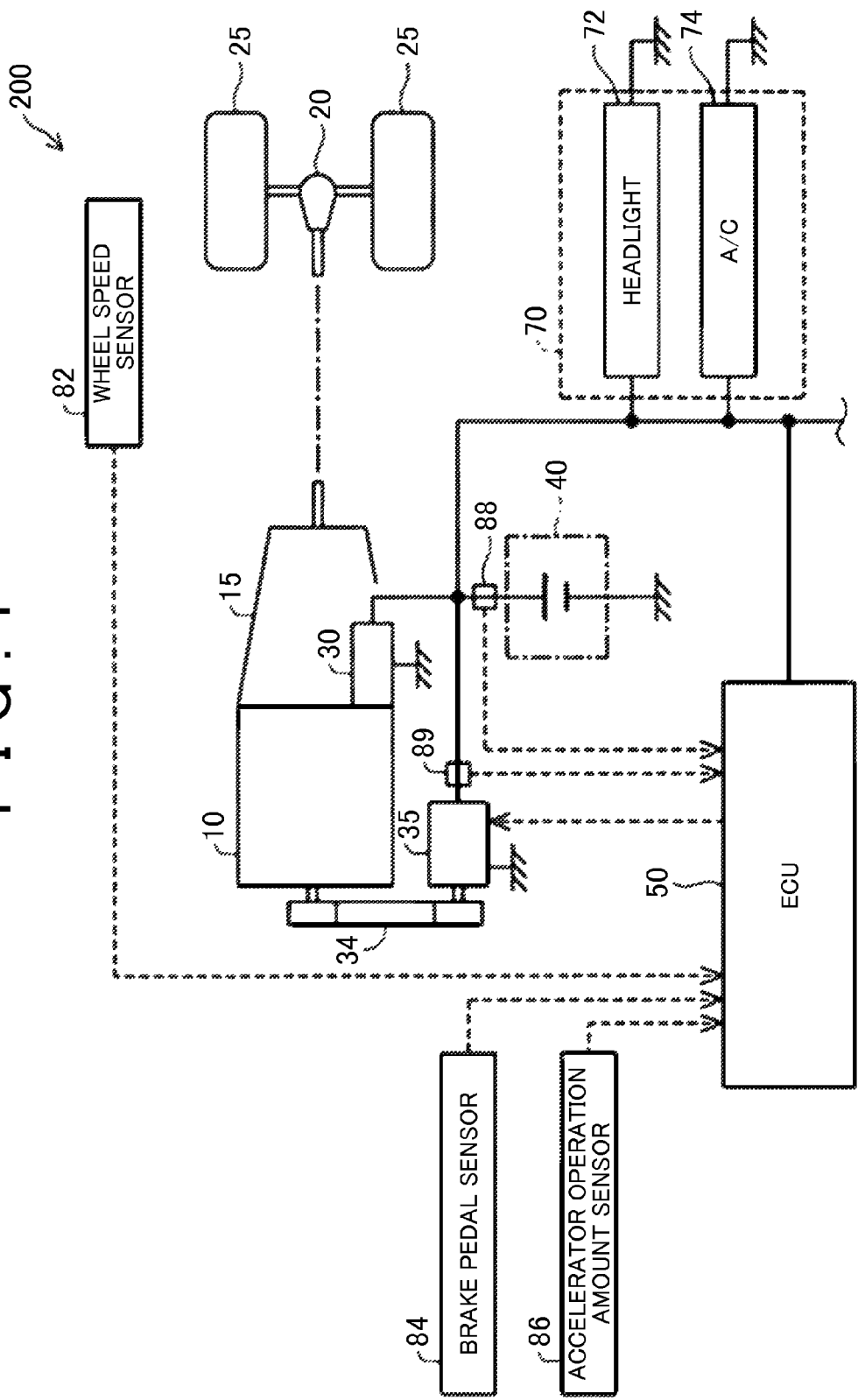
FIG. 1 is an explanatory view that illustrates the configuration of an automobile 200 as one embodiment of the present invention.

Embodiments of the present invention are described in the following order based on examples.
A. General configuration:
B. Configuration of ECU:
C. Configuration of target SOC estimation part:
D. Functions and effects:
E. Modifications:

A. General Configuration:

FIG. 1 is an explanatory view that illustrates the configuration of an automobile 200 as one embodiment of the present invention. The automobile 200 is a vehicle that is provided with an idling stop function. The automobile 200 includes an engine 10, an automatic transmission 15, a differential gear 20, driving wheels 25, a starter 30, an alternator 35, a battery 40, and an electrical control unit (ECU) 50.

The engine 10 is an internal combustion engine that burns a fuel, such as gasoline or light oil, to produce power. The power of the engine 10 is transmitted to the automatic transmission 15 and is also transmitted to the alternator 35 via a drive mechanism 34. The output from the engine 10 is changed in proportion to the amount of depression of the accelerator pedal (not shown) that is operated by the driver by an engine control computer (not shown).

The automatic transmission 15 automatically performs the changes of the transmission gear ratio (what is called gear shifting). The power (rotational speed or torque) from the engine 10 is changed in speed by the automatic transmission 15, and is transmitted as a desired rotational speed or torque to the right and left driving wheels 25 via the differential gear 20. In this way, the power of the engine 10 is changed in proportion to the amount of depression of the accelerator pedal and is transmitted to the driving wheels 25 via the automatic transmission 15 to accelerate or decelerate the vehicle (the automobile 200).

In this embodiment, the drive mechanism 34 that transmits power from the engine 10 to the alternator 35 employs a belt drive, configuration. The alternator 35 generates electric power using a portion of the power from the engine 10. The generated electric power is used to charge the battery 40 via an inverter (not shown). The electric power generation that is performed by the alternator 35 using power from the engine 10 is herein referred to as "fuel electric power generation." The alternator 35 corresponds to the "electric power generator" that is described in the section "MEANS FOR SOLVING THE PROBLEM."

The battery 40 is a lead battery as a DC power source with a voltage of pressure 14 V, and supplies peripheral devices that are provided outside the engine body with electric power. A peripheral device that is provided outside the engine body and operates on electric power from the battery 40 is herein refers to as "auxiliary machine." A group of auxiliary machines is referred to as "auxiliary machines." The automobile 200 includes head lights 72, an air conditioner (A/C) 74 and so on as the auxiliary machines 70.

The starter 30 is a starter motor that starts the engine 10 using electric power that is supplied from the battery 40. Usually, when the driver operates the ignition switch (not shown) to begin to drive the automobile from a parked status, the starter 30 is activated to start the engine 10. The starter 30 is also used to restart the engine 10 from an idling stop state as described below. The terms "idling stop state" as used herein refers to a stop state that is established by idling stop control.

The ECU 50 includes a CPU that executes computer programs, a ROM that stores the computer programs and so on, a RAM that temporarily stores data, input-output ports that are connected to various sensors and actuators, and so on. The sensors that are connected to the ECU 50 include a wheel speed sensor 82 that detects the rotational speed of the driving wheels 25, a brake pedal sensor 84 that detects whether the brake pedal (not shown) is being depressed, an accelerator operation amount sensor 86 that detects the amount of depression of the accelerator pedal (not shown) as an accelerator operation amount, a battery current sensor 88 that detects the charge/discharge current of the battery 40, and an alternator current sensor 89 that detects the output current from the alternator 35. The starter 30, the alternator 35 and so on correspond to the actuators. The ECU 50 receives electric power supply from the battery 40.

The ECU 50 controls the starter 30 and the alternator 35 based on signals from the various sensors as described above and the engine control computer (not shown) to control stop and restart of the engine (idling stop control) and to control the SOC of the battery 40. The ECU 50 is a vehicle control device that relates directly to the present invention.

Figure 2:
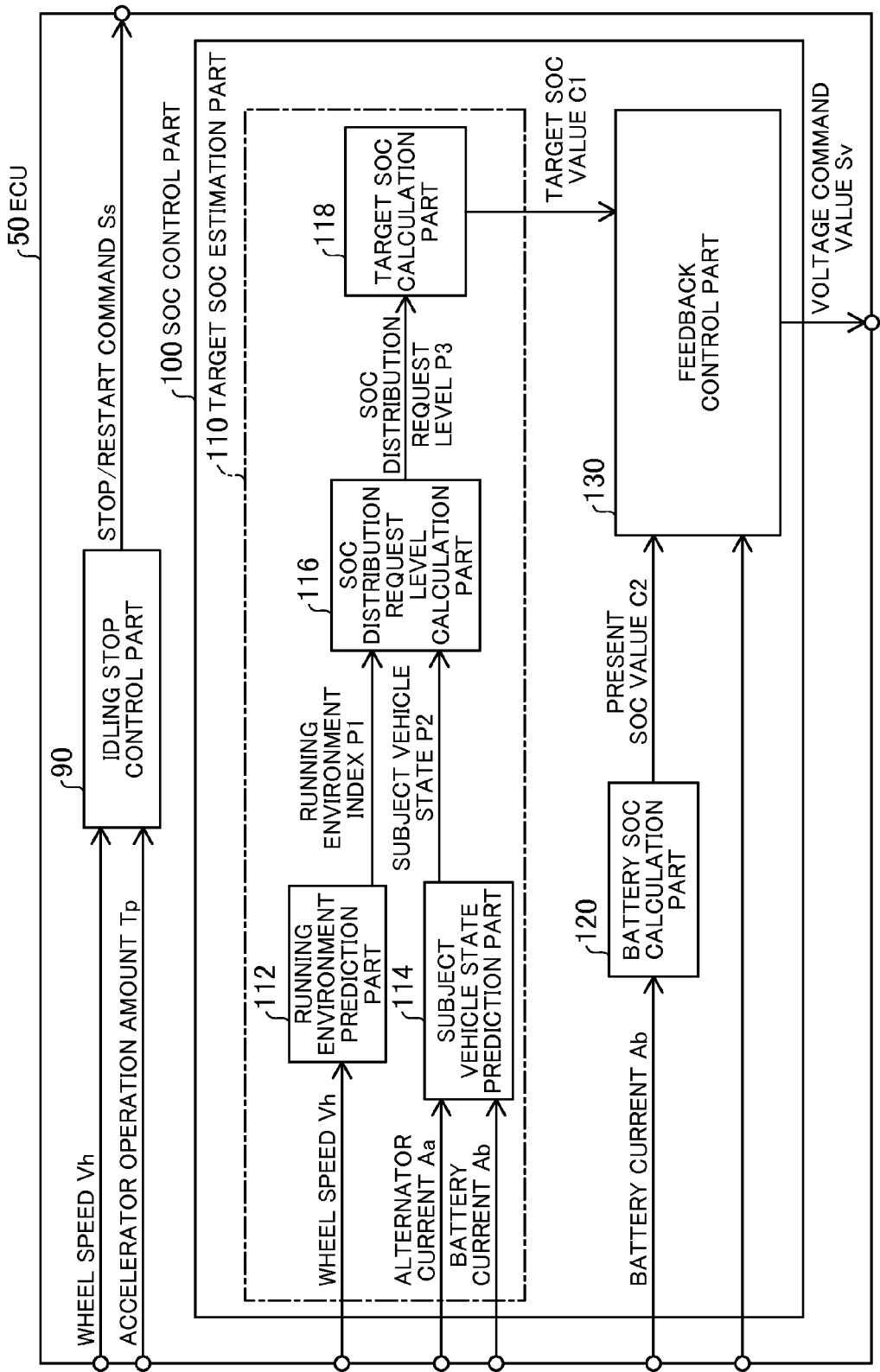
FIG. 2 is an explanatory view that illustrates the configuration of an ECU 50 from the perspective of its functions.

B. Configuration of ECU:

FIG. 2 is an explanatory view that illustrates the configuration of the ECU 50 from the perspective of its functions. As illustrated, the ECU 50 has an idling stop control part 90, and an SOC control part 100. In reality, the idling stop control part 90 and the SOC control part 100 are functions that the CPU in the ECU 50 realizes by executing the computer programs that are stored in the ROM.

The idling stop control part 90 acquires a wheel speed Vh that is detected by the wheel speed sensor 82 and an accelerator operation amount Tp that is detected by the accelerator operation amount sensor 86, and outputs a command Ss to stop/start the engine 10 to the starter 30. Specifically, the idling stop control part 90 determines that an engine stop condition is fulfilled and outputs a command Ss to stop the engine to the starter 30 when the wheel speed Vh is lowered to below a prescribed speed (10 km/h, for example), and then determines that an engine restart condition is fulfilled and outputs a command Ss to restart the engine to the starter 30 when depression of the accelerator pedal is detected based on the accelerator operation amount Tp.

In other words, the idling stop control part 90 stops the engine 10 when an engine stop condition is fulfilled, and restarts the engine 10 when an engine restart condition is fulfilled after the engine stop. The engine stop condition and the engine restart condition are not limited to those as described above. For example, the decrease of the wheel speed Vh to 0 km/h may be used as an engine stop condition, and the separation of the foot from the brake pedal may be used as an engine restart condition.

The SOC control part 100 includes a target SOC estimation part 110, a battery SOC calculation part 120, and a feedback control part 130. The target SOC estimation part 110 estimates the SOC that is predicted to be used during the period between the stop and restart of the engine by idling stop control (which is hereinafter referred to as "stop and start period") as a target SOC (which is hereinafter also referred to as "target SOC value") C1 when the vehicle is running (for example, the wheel speed Vh>0 km/h). The detailed configuration of the target SOC estimation part 110 is described in the section C. The target SOC estimation part 110 corresponds to the "idling stop capacity setting part" that is described in the section "MEANS FOR SOLVING THE PROBLEM." The "SOC" is defined as a value obtained by dividing the amount of electric power that remains in the battery by the amount of electric power that can be stored in the battery when the battery is fully charged.

The battery SOC calculation part 120 calculates the present SOC of the battery 40 (which is hereinafter referred to as "present SOC value") C2 based on the charge/discharge current Ab of the battery 40 (which is referred to as "battery current") that has been detected by the battery current sensor 88. Specifically, the battery SOC calculation part 120 calculates the present SOC value C2 by accumulating the charge/discharge current Ab by adding up charging currents of the battery 40 as positive values and discharging currents of the battery 40 as negative values. The configuration of the battery current sensor 88 and the battery SOC calculation part 120 corresponds to the "SOC detection part" that is described in the section "MEANS FOR SOLVING THE PROBLEM." The SOC detection part is not limited to that which performs the calculation based on the battery current that has been detected by the battery current sensor 88, and may be configured to perform the calculation based on a battery electrolytic solution specific gravity sensor, a cell voltage sensor, a battery terminal voltage sensor or the like. In addition, the SOC detection part is not necessarily configured to detect the amount of electric power that remains in the battery, and may detect the state of charge based on another parameter, such as the chargeable amount.

The feedback control part 130 obtains a difference value by subtracting the present SOC value C2 from the target SOC value C1 when the vehicle is running, and obtains a voltage command value Sv that causes the difference value to reach a value 0 by feedback control. The voltage command value Sv indicates the amount of electric power that the alternator 35 must generate and is sent to the alternator 35. As a result, the present SOC value C2 is controlled to be equal to the target SOC value C1 by fuel electric power generation. The configuration of the feedback control part 130 corresponds to the "remaining capacity control part" that is described in the section "MEANS FOR SOLVING THE PROBLEM."

Although not shown, the SOC control part 100 is also provided with a function that is called "battery control" and a function that is called "charge control" in addition to the above function. The battery control is described. A battery, in particular, the lead battery in this embodiment, has a usable SOC range (operable SOC range) that has been determined in advance according to the demand for a longer service life. Thus, "battery control" is performed to increase the SOC to the above SOC range by increasing the power of the engine 10 when the SOC of the battery 40 is lower than the lower limit value (60%, for example) of the SOC range and to decrease the SOC to the above SOC range by consuming the SOC when the SOC is higher than the upper limit value (90%, for example) of the SOC range. When the SOC falls below the lower limit value when the engine is kept stopped by idling stop control, the engine is started so that the SOC can be increased to the above SOC amount range by fuel electric power generation.

The "charge control" is a control operation that is performed to reduce the charge to the battery by fuel electric power generation in order to reduce the fuel consumption during normal running and to charge the battery by regenerative electric power generation during deceleration. While the charge control is well known and its detailed description is omitted, the operation as described below is generally performed.

In the charge control, the feedback control by the feedback control part 130 during normal running is performed when the target SOC value C1 exceeds the present SOC value C2, and a prescribed electric power generation cut voltage is sent to the alternator 35 as the voltage command value Sv when the target SOC value C1 is equal to or lower than the present SOC value C2 during normal running. By this configuration, charge during normal running can be reduced to reduce fuel consumption. The term "normal running" refers to a state of the automobile 200 that corresponds to neither "stop" where the vehicle speed is 0 km/h nor "deceleration" where regenerative electric power generation is performed:

C. Configuration of Target SOC Estimation Part:

The target SOC estimation part 110 includes a running environment prediction part 112, a subject vehicle state prediction part 114, an SOC distribution request level calculation part 116, and a target SOC calculation part 118.

The running environment prediction part 112 predicts the running environment. The term "running environment" as used herein refers to a parameter that indicates how often an idling stop state will be hereafter (from now on) established, in other words, a parameter that relates to the proportion of stop and start period in a prescribed period in the time to come. In other words, the "running environment" is the running environment of the vehicle in which the vehicle is brought to a stop by idling stop control. Specifically, the running environment prediction part 112 calculates a running environment index that indicates the running environment in the form of an index based on the wheel speed Vh that has been detected by the wheel speed sensor 82. Specifically, the running environment prediction part 112 calculates the proportion R of the vehicle stoppage time in a prescribed period (10 minutes, for example) immediately before the present based on the wheel speed Vh, and calculates a running environment index P1 from the proportion. In other words, the running environment prediction part 112 obtains the total vehicle stoppage time during which the wheel speed Vh was 0 in the prescribed period, calculates the proportion R by dividing the total by the entire length of the prescribed period, and calculates a running environment index P1 from the proportion R.

A high proportion R means that the vehicle was frequently brought to a stop and the stoppage period was long, and it can be predicted that the vehicle will be hereafter frequently brought to a stop and the stoppage period will be long. Thus, in this embodiment, the running environment index P1 is determined according to the following criteria.

When the proportion R of stoppage time in the 10 minute period<38%, the running environment index P1 is set to a value of 1.

When 38%≤the proportion R of stoppage time in the 10 minute period<42%, the running environment index P1 is set to a value of 2.

When 42%≤the proportion R of stoppage time in the 10 minute period<46%, the running environment index P1 is set to a value of 3.

When the proportion R of stoppage time in the 10 minute period≥46%, the running environment index P1 is set to a value of 4.

The threshold values are not necessarily limited to 38%, 42% and 46% as above, and may be different numerical values. The running environment index P1 to be obtained is not necessarily selected from the four numerical values 1 to 4, and may be selected from another number, such as three, five or six, of numerical values. Because it can be determined that the vehicle is in a suburban area when the running environment index P1 is low and that the vehicle in an urban area when the running environment index P1 is high, the degree of urbanization is considered to be higher as the running environment index P1 has a higher value.

While the running environment index P1 is obtained based on the wheel speed Vh that has been detected by the wheel speed sensor 82 in this embodiment, the present invention is not limited thereto. For example, the running environment index P1 may be configured to be obtained based on an average of vehicle speeds that have been detected by a vehicle speed sensor, the rate of change of the wheel speed Vh that is detected by the wheel speed sensor 82 (i.e., acceleration), the gear position of the manual transmission in the case of an MT (Manual Transmission) vehicle, the gear ratio of the automatic transmission or the like in the case of an AT (Automatic Transmission) vehicle. In other words, because the degree of urbanization is higher as the average vehicle speed is lower, the running environment index P1 should be set to a higher value as the average vehicle speed is lower. Because the degree of urbanization is higher as the rate of change of the wheel speed Vh is higher, the running environment index P1 should be set to a higher value as the rate of change of the wheel speed Vh is higher. Because the degree of urbanization is higher as the gear position of the manual transmission is changed more frequently, the running environment index P1 should be set to a higher value as the gear position of the manual transmission is changed more frequently. Because the degree of urbanization is higher as the gear ratio of the automatic transmission or the like is changed more frequently, the running environment index P1 should be set to a higher value as the gear ratio of the automatic transmission or the like is changed more frequently.

The running environment index P1 is not necessarily configured to be obtained based on one parameter selected from the wheel speed Vh and the parameters that can be used in place of the wheel speed Vh, and the running environment index P1 may be configured to be obtained based on two or more of the parameters. When two or more of the parameters are employed, it is preferred that the running environment index P1 be configured to be obtained using the parameters multiplied by respective weighting indices. When the wheel speed Vh or a parameter that can be used in place of the wheel speed Vh is employed, the running environment can be predicted only within the autonomous system, i.e., the automobile 200. In contrast to this, the running environment index P1 may be configured to be obtained based on information that is acquired from the outside of the autonomous system. One example of the information that is acquired from the outside of the autonomous system is road map information in a navigation system. The running environment index P1 may be obtained by determining whether the vehicle is hereafter going to travel in an urban or suburban area based on road map information in a navigation system.

The subject vehicle state prediction part 114 predicts the state of the automobile 200 (subject vehicle state). The term "subject vehicle state" as used herein refers to a parameter that indicates how much SOC the automobile 200 will hereafter consume. Specifically, the subject vehicle state prediction part 114 calculates the amount of electric power that will be consumed by the auxiliary machines 70 based on a battery current Ab that is detected by the battery current sensor 88 and an alternator current Aa that is detected by the alternator current sensor 89, and outputs the amount of electric power as a subject vehicle state P2. In this embodiment, when the amount of electric power that will be consumed by the auxiliary machines 70 is large, the subject vehicle state prediction part 114 obtains the amount of electric power that will be consumed by the auxiliary machines 70 as a subject vehicle state P2 because the SOC will be consumed at a high rate.

While the subject vehicle state P2 is obtained based on the amount of electric power that will be consumed by the auxiliary machines 70, the present invention is not limited thereto. For example, the subject vehicle state P2 may be configured to be obtained based on air conditioning information that has a correspondence relationship with the electric power that is consumed by the air conditioner (A/C) (for example, the difference between a target temperature and the temperature in the cabin), or information that indicates the warm-up condition of the engine, such as the difference between the engine coolant temperature and the ambient temperature. The subject vehicle state P2 is not necessarily configured to be obtained based on one parameter that is selected from the amount of electric power that will be consumed by the auxiliary machines 70, the air conditioning information, the warm-up condition information and so on, and the subject vehicle state P2 may be configured to be obtained based on two or more of the parameters. When two or more parameters are employed, it is preferred that the subject vehicle state P2 be configured to be obtained using the parameters multiplied by respective weighting indices.

In addition, while the present operating conditions of the auxiliary machines are determined based on sensor signals that are currently detected and the present operating conditions are regarded as the subject vehicle state in the time to come in each of the examples that are described above, the subject vehicle state in the time to come may be configured to be predicted by finding a sign of change of the operating conditions from the present operating conditions that are obtained as described above.

The running environment prediction part 112 and the subject vehicle state prediction part 114, which are configured as described above, continuously perform their prediction after the automobile 200 starts to be driven. In reality, the parts 122 to 124 are realized when the CPU in the ECU 50 executes the computer programs that are stored in the ROM. The running environment index P1 that is calculated by the running environment prediction part 112 and the subject vehicle state P2 that is calculated by the subject vehicle state prediction part 114 are sent to the SOC distribution request level calculation part 116.

The SOC distribution request level calculation part 116 calculates an SOC distribution request level P3 based on the running environment index P1 and the subject vehicle state P2, and the target SOC calculation part 118 calculates the target SOC value C1 based on the SOC distribution request level P3. In the following, the details of the SOC distribution request level calculation part 116 and the target SOC calculation part 118 are described in detail below.

Figure 3:
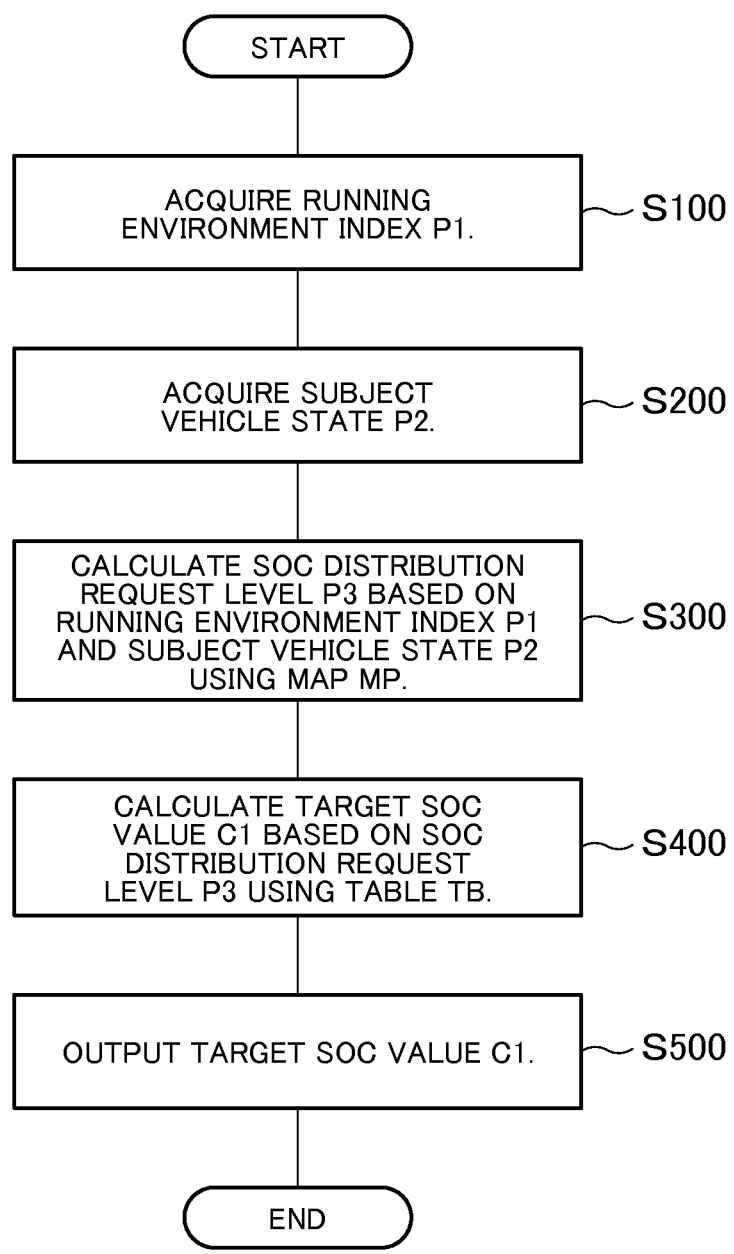
FIG. 3 is a flowchart that illustrates a target SOC estimating routine.

FIG. 3 is a flowchart that illustrates a target SOC estimating routine. The target SOC estimating routine is repeatedly executed at prescribed time intervals (every 60 sec, for example) while the vehicle is running. In other words, the target SOC estimating routine is not executed while the engine 10 is kept stopped by idling stop control. As illustrated, when the operation is started, the CPU of the ECU 50 acquires the running environment index P1 that is obtained by the running environment prediction part 112 (FIG. 2) (step S100), and acquires the subject vehicle state P2 that is obtained by the subject vehicle state prediction part 114 (FIG. 2) (step S200).

After carrying out step S200, the CPU performs an operation to calculate an SOC distribution request level based on the running environment index P1 and the subject vehicle state P2 using an SOC distribution request level calculating map MP (step S300). As described above, each battery has a usable SOC range that has been determined in advance based on the type of the battery. In this embodiment, distribution of the usable SOC range between a capacity for idling stop and a capacity for charge control is intended, and the "SOC distribution request level" is a parameter that designates the levels of the above distribution.

Figure 4:
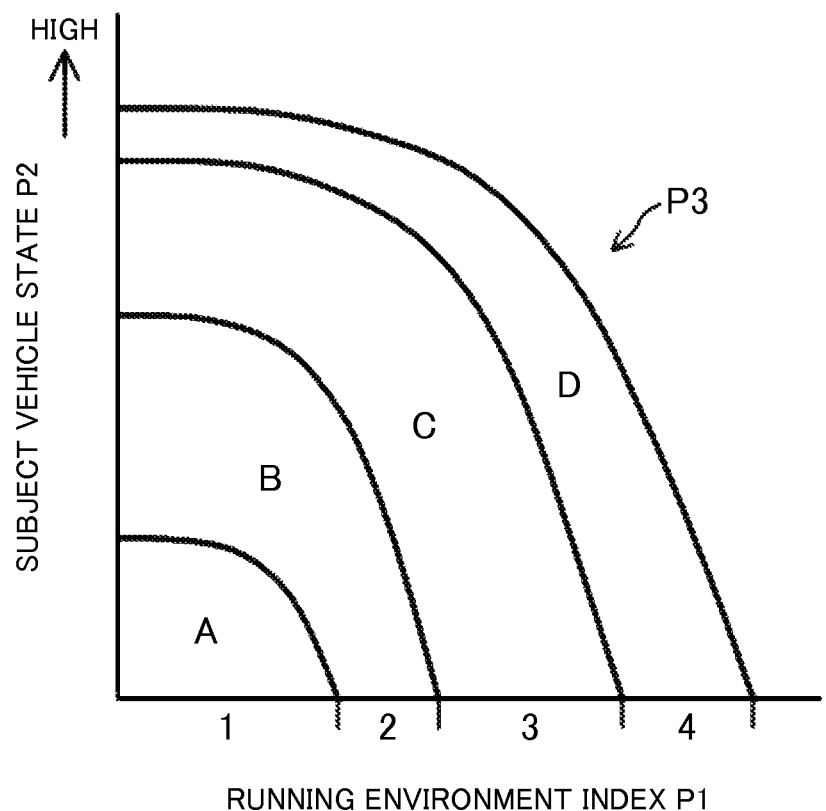
FIG. 4 is an explanatory view that illustrates an SOC distribution request level calculating map MP.

FIG. 4 is an explanatory view that illustrates the SOC distribution request level calculating map MP. As illustrated, the SOC distribution request level calculating map MP includes map data of SOC distribution request levels P3 that correspond to the running environment index P1 that is plotted on the horizontal axis and the subject vehicle state P2 that is plotted on the vertical axis. The SOC distribution request level calculating map MP is prepared by obtaining the relationship among the running environment index P1, the subject vehicle state P2 and the SOC distribution request level P3 experimentally or by simulation in advance, and is stored in the ROM. In step S300, the SOC distribution request level calculating map MP is retrieved from the ROM, and an SOC distribution request level P3 that corresponds to the running environment index P1 that has been obtained in step S100 and the subject vehicle state P2 that has been obtained in step S200 is acquired with reference to the map MP. In the illustrated example, four values A, B, C and D are prepared as the SOC distribution request levels P3. The values A, B, C and D are in an ascending order. The SOC distribution request level P3 has a higher value as the running environment index P1 is higher and the subject vehicle state P2 is higher.

Referring again to FIG. 3, after carrying out step S300, the CPU performs an operation to calculate a target SOC value C1 based on the SOC distribution request level P3 using a target SOC calculating table TB (step S400).

Figure 5:
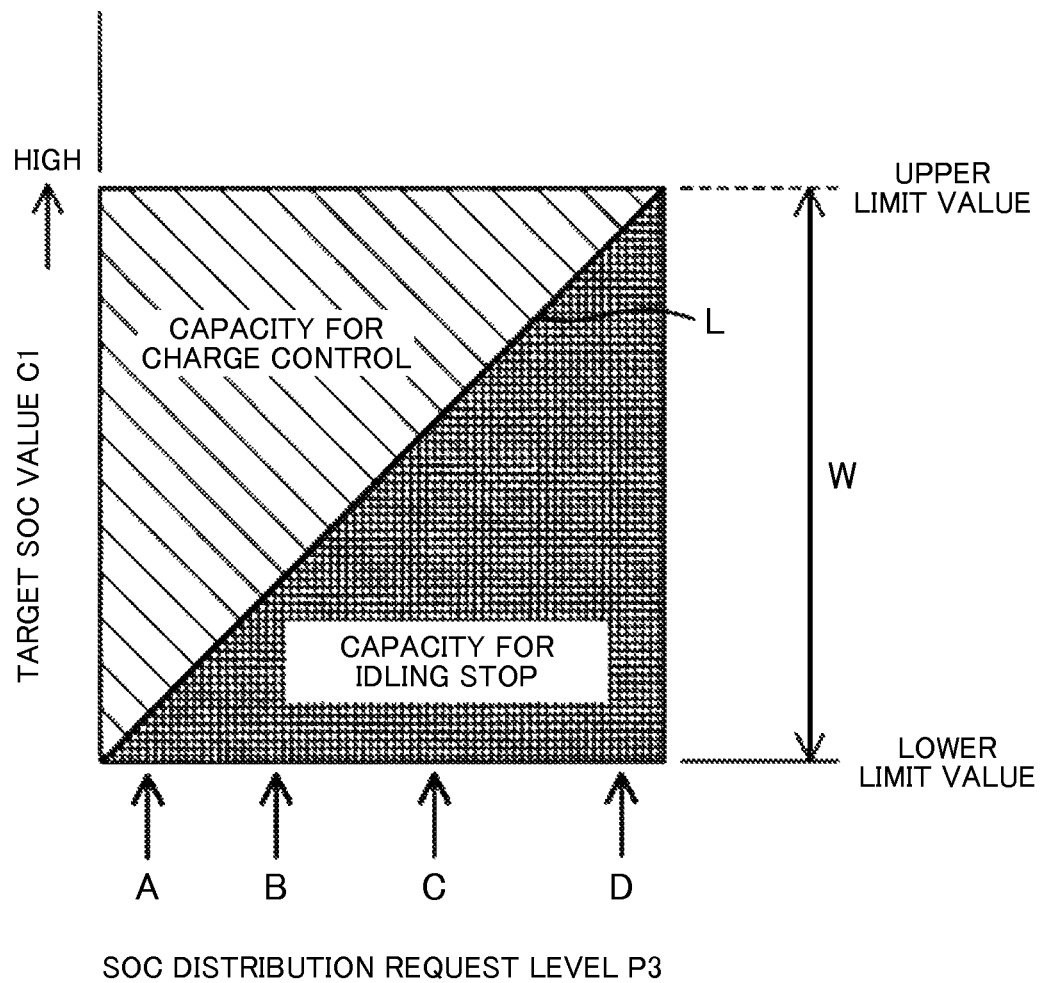
FIG. 5 is an explanatory view that illustrates a target SOC calculating table TB.

FIG. 5 is an explanatory view that illustrates the target SOC calculating table TB. As illustrated, the target SOC calculating table TB has a horizontal axis that represents the SOC distribution request level P3 and a vertical axis that represents the target SOC value C1, and includes a straight line L that indicates the relationship between the SOC distribution request level P3 and the target SOC value C1. The target SOC calculating table TB is prepared by obtaining the relationship between the SOC distribution request level P3 and the target SOC value C1 experimentally or by simulation in advance, and is stored in the ROM. In step S400, the target SOC calculating table TB is retrieved from the ROM, and a target SOC value C1 that corresponds to the SOC distribution request level P3 that has been calculated in step S300 is acquired with reference to the table TB.

As illustrated, the target SOC value C1 that is indicated by the straight line L is a value that is set within the usable SOC range W of the battery 40, and indicates the distribution ratio at which the usable SOC range W is distributed between a capacity for charge control and a capacity for idling stop. In other words, the region for the capacity for idling stop and the region for the capacity for charge control are set on the lower side and upper side, respectively, in the usable SOC range W of the battery 40, and the boundary between the regions is the target SOC value C1. It can be also considered that the level obtained by adding the capacity for idling stop to the lower limit value of the usable SOC range W is set as the target SOC value C1.

The capacity for charge control is the battery capacity that will be required as a result of the reduction of fuel electric power generation by the charge control as described above. The capacity for idling stop is the capacity that is predicted to be used during the stop and start period in the time to come. In this embodiment, the capacity for idling stop is set to the maximum expected value. The higher the SOC distribution request level P3, the greater the capacity for idling stop. When the SOC is controlled to be in the region above the straight line L, the remaining capacity in the usable SOC range that corresponds to the SOC exceeds the capacity for idling stop and idling stop control can be therefore carried out completely. However, the remaining capacity is excessive by the amount by which it exceeds the capacity for idling stop. Thus, the target SOC value C1 that is indicated by the straight line L is considered to represent the SOC that is enough to carry out idling stop control completely in the time to come and to reduce the amount of electric power generation for SOC storage to a minimum.

While the target SOC value C1 linearly increases with the increase of the SOC distribution request level P3 as indicated by the straight line L, the present invention is not limited thereto. For example, the target SOC value C1 may be configured to be determined such that the target SOC value C1 linearly increases with the increase of the SOC distribution request level P3 when the SOC distribution request level P3 is equal to or lower than a prescribed value and maintains a constant value when the SOC distribution request level P3 is higher than the prescribed value. This configuration is effective in the case of a battery that has a relatively small usable SOC range. In addition, the change of the target SOC value C1 may be configured to be represented by a curved line instead of a straight line.

Referring again to FIG. 3, after carrying out step S400, the CPU outputs the target SOC value C1 that has been calculated in step S400 to the feedback control part 130 (step S500), and then terminates the current target SOC estimating routine. In the feedback control part 130 (FIG. 2), the present SOC value C2 is controlled to be equal to the calculated target SOC value C1. While the present SOC value C2 represents the remaining capacity in the usable SOC range of the battery 40, the remaining capacity is prevented from falling below the capacity for idling stop while the vehicle is running as a result of the above control. In other words, when the present SOC value is in the region of the capacity for charge control in FIG. 5, in other words, when the remaining capacity exceeds the capacity for idling stop, charge control is performed to reduce the charge to the battery 40 by the fuel electric power generation. Then, immediately before the SOC falls below the capacity for idling stop, the SOC is controlled to be equal to the target SOC value C1 that is indicated by the straight line L by fuel electric power generation and is prevented from falling below the capacity for idling stop.

Figure 6:
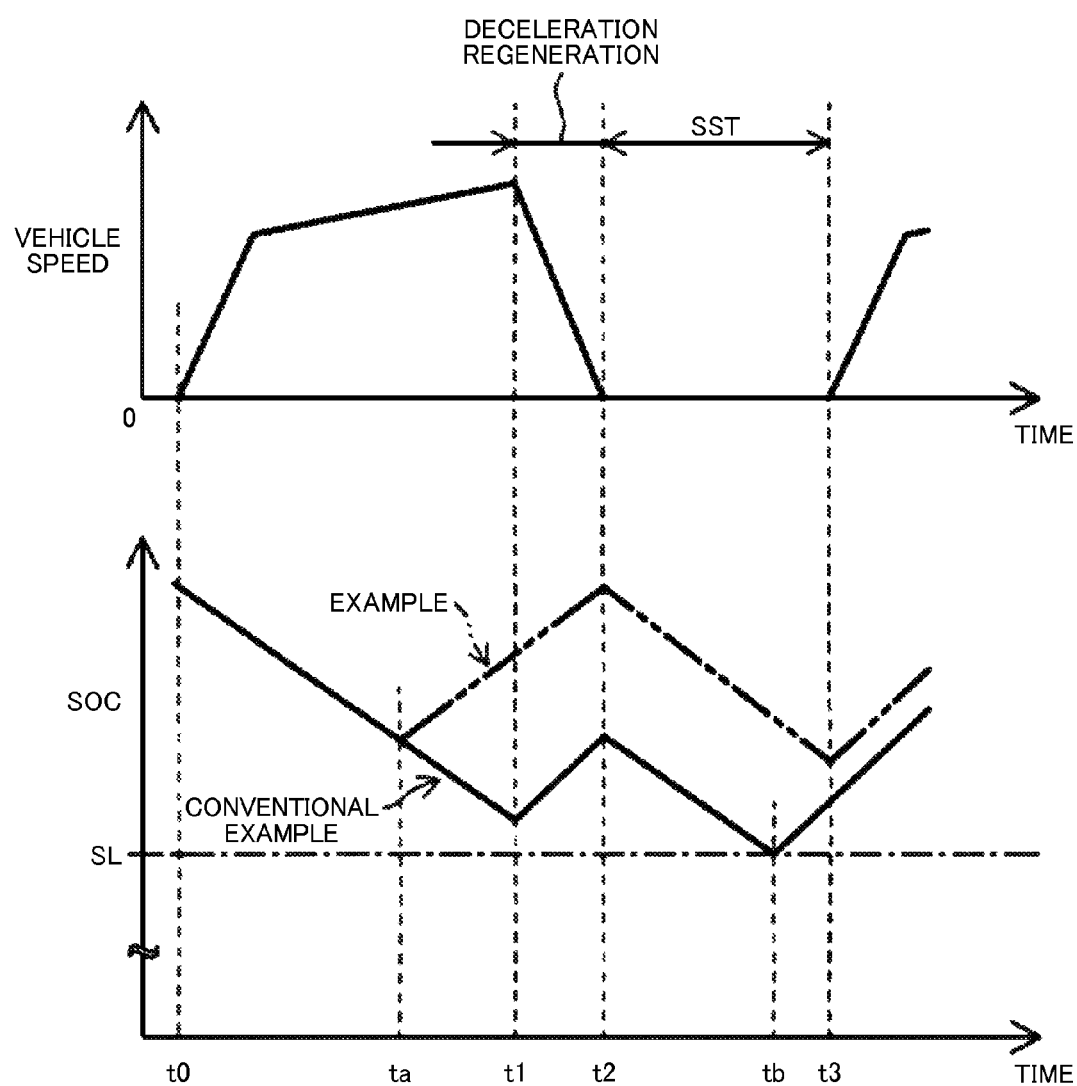
FIG. 6 is an explanatory view that illustrates a time chart regarding the vehicle speed and SOC during driving of the automobile.

D. Functions and effects:

FIG. 6 is an explanatory view that illustrates a time chart regarding the vehicle speed and the SOC (present SOC value C2) of the battery 40 during driving of the automobile 200. The time chart has vertical axes that represent the vehicle speed and SOC, respectively, and a horizontal axis that represents the time. Once the automobile 200 starts to be driven and the automobile 200 starts moving at Time t0, the vehicle speed gradually increases and the automobile 200 is brought to normal running. After that, the vehicle is brought into a decelerating state at Time t1. In the t0-t1 period from Time t0 to Time t1, the SOC gradually decreases as indicated by a solid line. The solid line represents the SOC in a conventional example, whereas the SOC changes as indicated by a dashed-two dotted line in this embodiment. This is described in detail later.

After Time t1, the vehicle is brought to a stop at Time t2. In the t1-t2 period, regenerative electric power generation takes place because the vehicle is decelerated and the SOC gradually increases as indicated by a solid line. The period from Time t2 (strictly, the moment when an engine stop condition is fulfilled) to Time t3 when the vehicle speed starts to increase again is a stop and start period SST, during which the engine 10 is kept stopped. In the stop and start period SST, the SOC gradually decreases because of the consumption of electric power by the auxiliary machines. In the conventional example, when the SOC reaches the lower limit value SL (Time tb) as indicated by a solid line while the engine 10 is kept stopped, the engine 10 is restarted by battery control. After the restart, electric power is generated using power from the engine 10 as indicated by a solid line and the SOC increases.

In this embodiment, when the SOC decreases until the remaining capacity in the usable SOC range of the battery 40 falls below the capacity for idling stop during normal running (Time ta), the SOC is increased by fuel electric power generation. As indicated by dashed-two dotted line in the drawing, the SOC increases in the ta-t2 period. Because this increase takes the maximum battery capacity that is predicted to be used in the stop and start period in the time to come into account, even if the SOC decreases in the stop and start period t2-t3, the SOC does not reach the lower limit value SL. The term "stop and start period in the time to come" is not limited to one stop and start period SST as shown in the drawing. When a plurality of stop and start periods is included in the prescribed period, all of the stop and start periods are included in the stop and start period in the time to come.

Thus, in this embodiment, a situation in which the engine 10 is restarted in the stop and start period t2-t3 because the SOC reaches the lower limit value does not takes place in contrast to the conventional example. When the engine is restarted because of a shortage of SOC in the middle of the stop and start period, three to almost five times as much as fuel is required compared to the case where engine power is increased to increase the SOC while the engine is operating. In other words, the fuel efficiency effect per unit SOC (1% of SOC, for example) that can be obtained when the engine is operating is three to five times superior to that in the case where the engine is restarted in the middle of a stop and start period because of a shortage of SOC. Thus, the automobile 200 of this embodiment can improve the fuel efficiency compared to the conventional example.

E. Modifications:

It is appreciated that this invention is not limited to the above examples and embodiments and may be embodied in various ways without departing from the gist thereof. For example, the following modifications are also possible.

Modification 1:

While the SOC distribution request level P3 is obtained based on the running environment index P1 and the subject vehicle state P2 in the above examples, the SOC distribution request level P3 may instead be configured to be obtained based on the amount of operation of a dial that is provided on the instrument panel (not shown) of the automobile 200 for operation by the driver. When the automobile 200 travels into an urban area from a suburban area, for example, the driver can increase the target SOC, in other words, the distribution rate for idling stop, by turning the dial to "High" to change the setting so that the SOC distribution request level P3 can increase. According to this configuration, when the driver can recognize the area which the automobile 200 will enter from now sufficiently to set the SOC distribution request level, the maximum SOC that will be used in a stop and start period can be set with a high degree of accuracy based on the running environment. The dial may be a dial that can adjust the SOC distribution request level in two levels, "High" and "Low," or a dial that can adjust in multiple levels of three or more. The dial may be replaced by another input means, such as a switch. In addition, instead of obtaining the SOC distribution request level P3 based only on the amount of operation of the dial, the SOC distribution request level P3 that is obtained based on the running environment index P1 and the subject vehicle state P2 in the above example may be configured to be corrected based on the amount of operation of the dial.

Modification 2

While the SOC distribution request level P3 is configured to be obtained based on the running environment index P1 and the subject vehicle state P2 and then the target SOC is configured to be calculated based on the SOC distribution request level P3 in the above examples, the target SOC may instead be configured to be directly calculated based on the running environment index P1 and the subject vehicle state P2. In other words, the distribution ratio at which the usable SOC range of the battery is distributed between a capacity for charge control and a capacity for idling stop may be configured to be directly calculated based on the running environment index P1 and the subject vehicle state P2. Similarly, the target SOC may be configured to be directly calculated based on the amount of operation of the dial in the above modification 1.

Modification 3:

While the SOC distribution request level is calculated based on both the running environment index P1 and the subject vehicle state P2 in the above examples, the SOC distribution request level may instead be configured to be calculated based on either the running environment index P1 or the subject vehicle state P2.

Modification 4:

While the battery is a lead battery in the above examples, the present invention is not limited thereto. For example, the battery may be replaced by a battery of a different type, such as a lithium ion storage battery, or a rocking chair type electric power storage device. While the vehicle is an automobile in the above example, the vehicle may instead be a vehicle other than an automobile, such as an electric train.

Modification 5:

Some of the functions that are realized by software in the above example may be realized by hardware (such as an integrated circuit), and some of the functions that are realized by hardware in the above example may be realized by software.

Modification 6:

The elements other than the elements that are described in independent claims among the constituent elements in the examples and modifications that are described above are additional elements and may be omitted if desired. For example, the charge control, which is performed to reduce the charge to the battery to reduce the fuel consumption during normal running and to charge the battery by regenerative electric power generation during deceleration, may be omitted.

DESCRIPTION OF REFERENCE NUMERALS AND SYMBOLS

10/ ENGINE
15/ AUTOMATIC TRANSMISSION
20/ DIFFERENTIAL GEAR
25/ DRIVING WHEEL
30/ STARTER
34/ DRIVE MECHANISM
35/ ALTERNATOR
40/ BATTERY
50/ ECU
70/ AUXILIARY MACHINES
72/ HEAD LIGHT
74/ AIR CONDITIONER
82/ WHEEL SPEED SENSOR
84/ BRAKE PEDAL SENSOR
86/ ACCELERATOR OPERATION AMOUNT SENSOR
88/ BATTERY CURRENT SENSOR
89/ ALTERNATOR CURRENT SENSOR
90/ IDLING STOP CONTROL PART
100/ SOC CONTROL PART
110/ TARGET SOC ESTIMATION PART
112/ RUNNING ENVIRONMENT PREDICTION PART
114/ SUBJECT VEHICLE STATE PREDICTION PART
116/ SOC DISTRIBUTION REQUEST LEVEL CALCULATION PART
118/ TARGET SOC CALCULATION PART
120/ BATTERY SOC CALCULATION PART
130/ FEEDBACK CONTROL PART
200/ AUTOMOBILE

The invention claimed is:

1. A vehicle control device for a vehicle including an engine and a battery, the battery can be charged by an amount of electric power generated by an electric power generator, the electric power generator is driven by power from the engine, the vehicle control device comprising:
   an electrical control unit configured to;
   (i) perform idling stop control,
   (ii) detect a state of charge (SOC) of the battery,
   (iii) set a capacity for idling stop that is predicted to be used in a stop and start period between stop and restart of the engine, during the idling stop control, within an usable SOC range of the battery while the vehicle is running, and (iv) control the amount of electric power to prevent a remaining capacity in the usable SOC range corresponded to the state of charge from falling below the capacity for idling stop while the vehicle is running, wherein the electrical control unit is configured to predict a running environment of the vehicle in which the vehicle is brought to a stop, and determine the capacity for idling stop based on the running environment.

2. The vehicle control device according to claim 1, wherein the electrical control unit is configured to reduce the electric power generation by the electric power generator while the vehicle is running, and permit the charge to the battery by regenerative electric power generation during deceleration of the vehicle, and set a parameter as the capacity for idling stop, the parameter is a parameter to define a distribution ratio at which the usable SOC range of the battery is distributed between a capacity for charge control and the capacity for idling stop, the capacity for charge control is required as a result of the reduction of the electric power generation by the electric power generator.

3. The vehicle control device according to claim 1, wherein the vehicle further includes auxiliary machines that operate using the state of charge of the battery, and wherein the electrical control unit is configured to calculate a subject vehicle state that relates to an operating condition of the auxiliary machine, and determine the capacity for idling stop based on the subject vehicle state in addition to the running environment.

4. The vehicle control device according to claim 1, wherein the vehicle further includes auxiliary machines that operate using the state of charge of the battery, and wherein the electrical control unit is configured to calculate a subject vehicle state that relates to an operating condition of the auxiliary machine, and determine the capacity for idling stop based on the subject vehicle state.

5. A vehicle comprising:
an engine;
a battery that is charged by an amount of electric power generated by an electric power generator, the electric power generator driven by power from the engine;
an electrical control unit configured to;
(i) perform idling stop control,
(ii) detect a state of charge (SOC) of the battery,
(iii) set a capacity for idling stop that is predicted to be used in a stop and start period between stop and restart of the engine, during the idling stop control, within an usable SOC range of the battery while the vehicle is running; and
(iv) control the amount of electric power to prevent a remaining capacity in the usable SOC range corresponded to the state of charge from falling below the capacity for idling stop while the vehicle is running, wherein the electrical control unit is configured to predict a running environment of the vehicle in which the vehicle is brought to a stop, and determine the capacity for idling stop based on the running environment.

6. A vehicle control method for controlling vehicle including an engine and a battery, the battery can be charged by an amount of electric power generated by an electric power generator, the electric power generator is driven by power from the engine, the vehicle control method comprising:

performing idling stop control, by an electrical control unit;

detecting, by the electrical control unit, a state of charge (SOC) of the battery;

setting, by the electrical control unit, a capacity for idling stop that is predicted to be used in a stop and start period between stop and restart of the engine, during the idling stop control, within an usable SOC range of the battery while the vehicle is running; and controlling, by the electrical control unit, the amount of electric power to prevent a remaining capacity in the usable SOC range corresponded to the state of charge from falling below the capacity for idling stop while the vehicle is running, wherein the electrical control unit is configured to predict a running environment of the vehicle in which the vehicle is brought to a stop, and determine the capacity for idling stop based on the running environment.

* * * * *